April 10, 1962 A. R. ESSEX 3,028,777
BLIND FASTENER SETTING WRENCH
Filed June 29, 1959 3 Sheets-Sheet 1
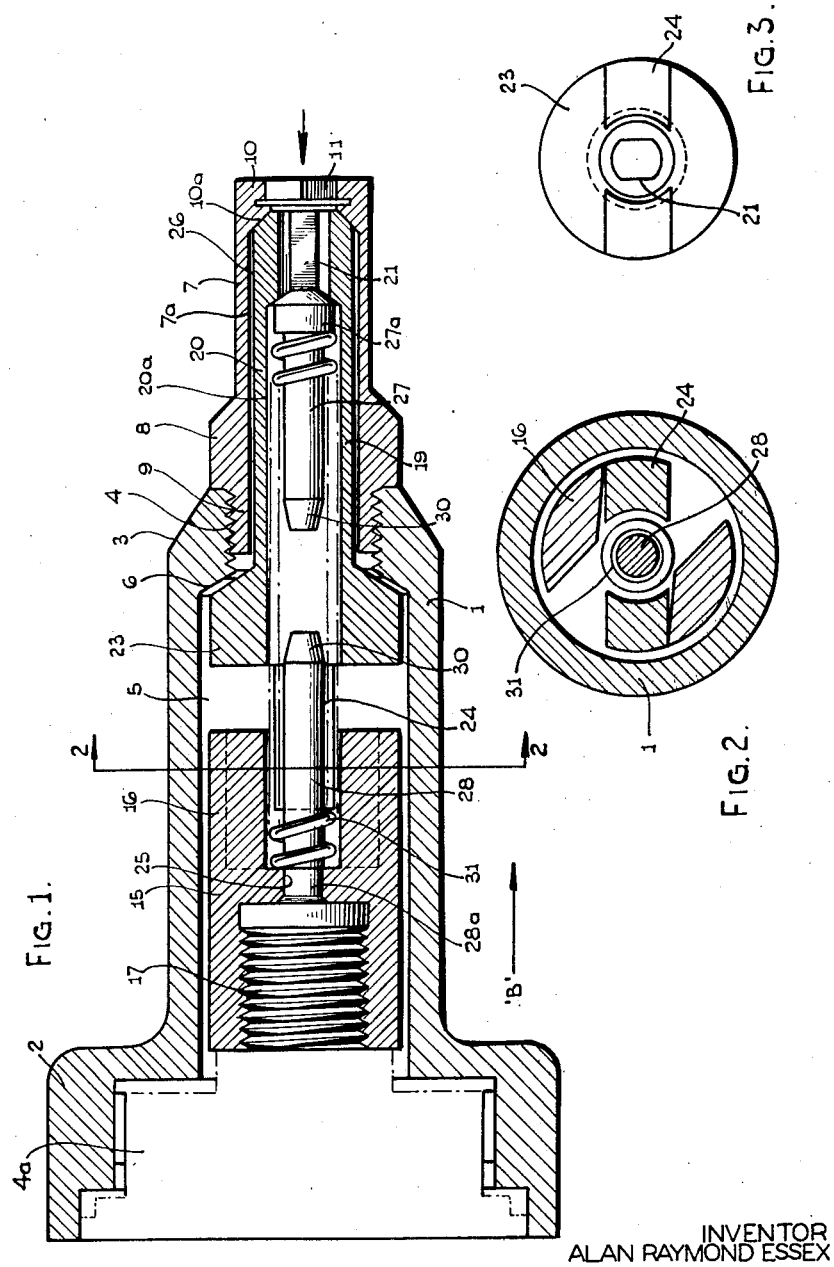
INVENTOR
ALAN RAYMOND ESSEX
ATTORNEYS April 10, 1962  A. R. ESSEX  3,028,777
BLIND FASTENER SETTING WRENCH
Filed June 29, 1959  3 Sheets-Sheet 2
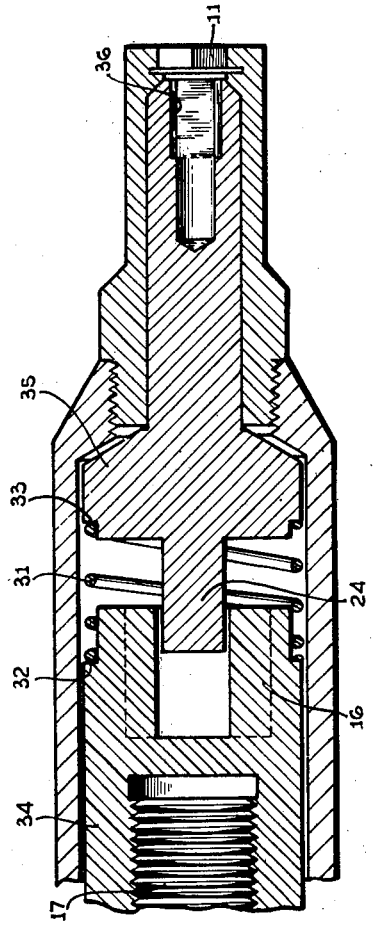
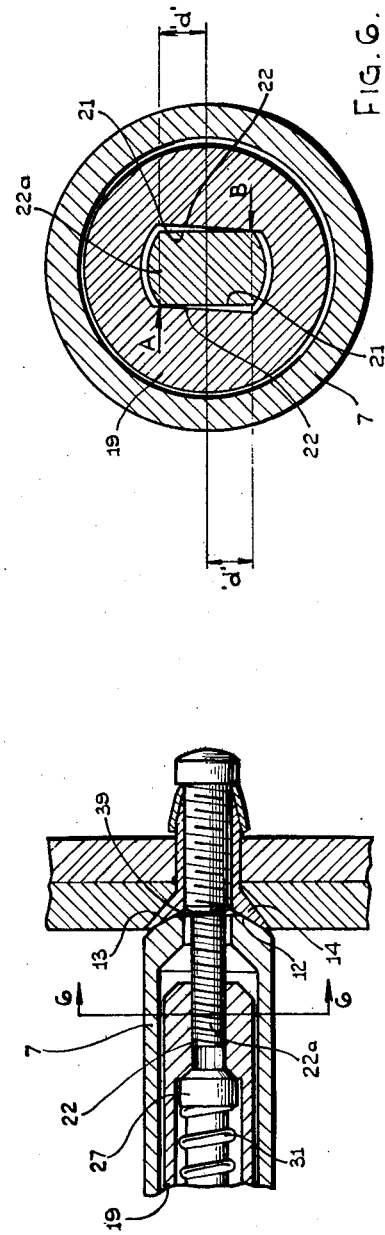
INVENTOR
ALAN RAYMOND ESSEX
ATTORNEYS

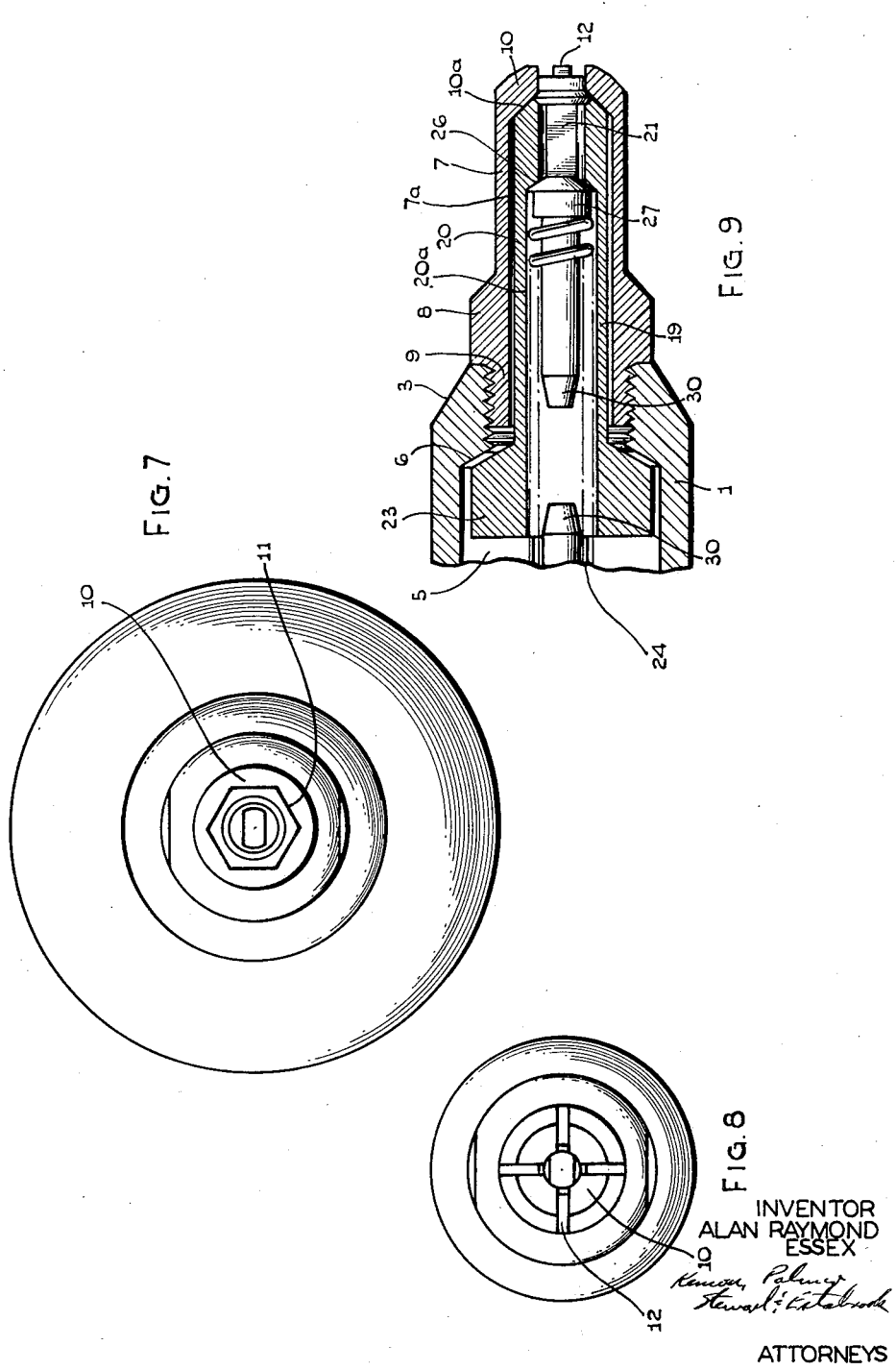

United States Patent Office 3,028,777
Patented Apr. 10, 1962

3,028,777
BLIND FASTENER SETTING WRENCH
Alan Raymond Essex, St. Albans, England, assignor to Avdel Limited, a British company
Filed June 29, 1959, Ser. No. 823,414
Claims priority, application Great Britain July 2, 1958
3 Claims. (Cl. 81—55)

This invention relates to a driving and setting tool for nut and bolt type blind fasteners and of the kind wherein the driving member is rotatably supported within a tubular stationary guide, the guide having wrenching surfaces for holding one element of a fastener against rotation, and the rotatable member having a wrenching surface for effecting rotation of the other element of the fastener.

A known type of driving and setting tool comprises a cylindrical housing, a stationary tubular guide fixed to the housing at one end and formed with wrenching surfaces at its other end, and rotatable within the guide, a power operated driving member formed with a socket having a small hole at its forward end which serves as a wrenching surface. The small hole in the socket of the driving member merges into a larger hole, thus forming a shoulder at the juncture of the two holes. Within the larger hole is housed a spring-influenced ejector piston which is urged by a compression spring housed within the larger hole to eject a piece of the bolt which is broken off upon completion of the setting operation.

This known tool is used for setting a type of blind fastener which includes an outer member in the form of a nut having an expander cone at one end and at its other end a head having wrenching surfaces or slots for engagement by the tubular stationary guide of the tool. The fastener also includes an inner member in the form of a bolt, the head of which serves to drive a sleeve (forming part of the fastener) over the expander cone of the nut and the stem of which is elongated and formed with flats for engagement by the socket of the driving member of the tool. This elongated part of the stem of the bolt projects through the head of the nut and is grooved circumferentially so as to be readily broken off as the setting operation is completed.

In using this known tool it is necessary for the operator to apply considerable force to maintain the engagement of the inner end of the guide with the cruciform slots formed in the countersunk head of the nut. This force must be exerted to counteract the longitudinal reactive thrust of the bolt on the driving member of the tool, as the bolt screws out of the nut during the placing action. This longitudinal thrust is transmitted by the substantial frictional grip between the driving flats of the bolt and the wrenching surfaces in the socket of the driving member during the transmission therebetween of the placing torque. This considerable force causes unnecessary strain to the operator who is frequently unable to prevent slipping of the tool from engagement with the cruciform slots in the head of the nut. Furthermore, where fasteners are being set in thin sheets which are not well supported, excessive force applied to the tool in order to maintain engagement with the nut may cause buckling or deformation of the sheets into which the fastener is set.

One object of the invention is to provide a tool which enables the setting of aforesaid type of fasteners without undue exertion on the part of the operator. Another object of the invention aims at preventing the buckling or deformation of thin sheets into which the fastener is set.

According to the present invention, in a driving and setting tool for nut and bolt type fasteners such as that referred to, there is slidable axially within the tubular guide a coupling member having wrenching surfaces for engaging the stem of the bolt at one end to apply a driving force thereto at points removed radially from the bolt center to effect transmittal of the necessary driving torque. At its other end, the member is formed having axial lugs slidably engaged by axial lugs on a driving shaft, the point of lug engagement being removed radially from the center of the members farther than the point of driving force application to the bolt. The coupling member is moved against spring influence further within the tubular guide by the pressure of the bolt as the setting operation proceeds.

A preferred form of the invention will now be described with reference to the accompanying drawings, in which:

FIG. 1 is a view in sectional elevation showing the tool in accordance with the invention.

FIG. 2 is a view in cross section on the line 2—2 of FIG. 1.

FIG. 3 is an end view of the coupling member, as seen in the direction of the arrow B in FIG. 1.

FIG. 4 is a view in sectional elevation of a modified form of the coupling member.

FIG. 5 is a fragmentary view in section of the driving and setting tool showing the coupling member being moved against spring influence as the setting operation of the fastener proceeds.

FIG. 6 is a view in cross section on the line 6—6 of FIG. 5.

FIG. 7 is an end view of the adaptor tool looking in the direction of the arrow in FIG. 1.

FIG. 8 is an end view looking at the nose end of the tool as shown in FIG. 9.

FIG. 9 is a fragmentary view in section of the adaptor tool in which the nose of the tubular guide is formed with projecting lugs.

As shown in FIGS. 1–3 of the drawing the driving and setting tool comprises a tubular housing 1 which is formed at its one end with an enlargement 2 and at its other end with a conical nose 3, both of which are internally screw threaded. The housing 1 has a cylindrical bore 5 merging into a bore 4 of reduced diameter at the nose 3 and into a bore 4a of enlarged diameter at the enlargement 2 of the housing 1. A frusto-conical internal wall or shoulder 6 is formed at the juncture of two bores 4 and 5. A tubular guide 7 having a bore 7a is formed near its one end with a flange 8 and with an externally screw threaded extension 9 which is screwed into the nose 3 of the housing 1. At its other end the guide is formed with a nose 10 and with an internally tapering shoulder 10a. The nose 10 has a hexagonal inner wall 11 serving as wrenching surfaces (see FIG. 1) for engagement with a hexagonal nut of the blind fastener (not shown); alternatively the wrenching surfaces of the tubular guide 7 may be constituted by lugs 12 projecting from the nose 10 for engagement with cruciform slots 13 on a countersunk head of a nut 14 (see FIGS. 5 and 9). A first externally cylindrical driving member or coupling part 15 is formed with a central aperture 17 which is tapped so that the coupling part 15 may be screwed on a power driven shaft, e.g. of a motor (not shown). At its opposite end the coupling part 15 is recessed so as to present two axial lugs 16 diametrically disposed to each other and co-axial with the housing 1. The purpose of these lugs 16 will be later described. The coupling part 15 is formed with a small hole 25 communicating with the recess formed between the two prongs 16. A second externally cylindrical coupling part 19 is slidably and rotatably mounted within the guide 7. The coupling part 19 comprises an elongated tube 20 having at its one end a substantially rectangular hole 21 communicating with a bore 20a of the tube 20. The rectangular hole 21 offers wrenching surfaces to diametrical flats 22 provided on the stem of the bolt 22a of the blind fastener, FIGS. 5 and 6. At its other end the coupling part 19 has a cylindrical head 23 cut away at both sides to present two apertured lugs or dogs 24 which extend between the two lugs 16 of the driving or coupling part 15 (see FIGS. 1 and 2). The length of the dogs 24 is substantially equal to the depth of the two prongs 16 of the driving or coupling part 15. The bore 20a of the coupling part 19 has an inwardly inclined step or shoulder 26 adjacent its wrenching surfaces 21. A headed cylindrical pin 27 is slidably located within the hole 20a of the coupling part 19 abutting with its head 27a against the inclined shoulder 26, whilst another cylindrical pin 28 with its shank 28a of reduced diameter projects into the central hole 25 of the coupling part 15 and is secured therein. The two pins 27 and 28 are both formed with pointed ends 30, directed towards one another. A coiled compression spring 31 is disposed between the coupling part 15 and the coupling part 19 and is axially supported by the guide pins 27 and 28 over which it is supported. The spring 31 urges the coupling part 19 continuously to its furthest point (see FIG. 1) thus allowing it to engage the flats 22 on the bolt 22a for the setting operation.

An alternative embodiment of the adaptor tool is shown in FIG. 4 in which the number of components is reduced by making the spring 31 larger in diameter than in the embodiment described and engaging it against a shoulder 32 formed on the coupling part 34 and against a shoulder 33 on the coupling part 35. In this embodiment the guide pins 27 and 28 are omitted and the coupling part 35 no longer need be hollow. The coupling part 35 which is resiliently slidable relative to the coupling part 34 is formed with a substantially rectangular hole 36, which, for example, may be broached blind.

The adaptor tool in accordance with the invention is particularly useful in placing blind expansion bolts (see FIG. 5) in which the nut has a countersunk head 14 formed with cruciform slots 13. If the nut 14 has a hexagonal shape then the guide 7 of the adapter tool will have wrenching surfaces 11 as shown in FIG. 1.

In use the adaptor tool is brought against the blind bolt 22a to be set, the lugs 12 of the guide 7 (see FIG. 5) engage the cruciform slots 13 in the countersunk head of the nut 14 and hold it against rotation whilst the rotary coupling part 15 (see FIG. 1) transmits driving torque to the coupling part 19 by means of the lugs 16 and the dogs 24. The coupling part 19 in turn transmits the drive via the wrenching surfaces 21 to the stem of the bolt 22a. The efforts of the operator to set the fastener and to prevent slipping of the improved tool, particularly when flush head nuts are incorporated in the fastener, are greatly minimized.

The achievements of the invention may be simply explained by a mathematical equation. FIG. 6 shows a sectional end view of the driving flats 22 of the bolt 22a together with a superimposed section through the coupling part 19. To transmit the necessary driving torque required to place the blind fastener, contact is made between the wrenching surfaces 21 and the flats 22 on the bolt 22a at points A and B. These points are at a distance d from the centre. If the torque required to place the bolt 22a is T, then the normal force P existing between the coupling part 19 and the stem 22 of the bolt 22a at points A and B will be $$\frac{T}{2d}$$

If the coefficient of friction between the coupling part 19 and the bolt 22a is $\mu$ then the axial force tending to push the tool out of engagement with the nut will be $2\mu P$;

$$F = \frac{\mu T}{d}$$

From this equation $\mu$ is virtually a constant and T cannot be reduced since it is determined by the strength of the bolt at the breaker groove 39 formed on the stem of the bolt 22a to ensure correct placing of the blind fastener. Therefore in this equation the only way in which F can be reduced is by making d greater. From FIG. 6 it can be seen that because of the general dimensions of the bolt, d cannot be altered, so far as the bolt is concerned but the dimension d as regards the lugs 16 and the dogs 24 is much greater, and so in use the bolt 22a and with it the coupling part 19 can slide within the tool without transmitting any great force tending to shift the tool so that the lugs on the guide 16 do not ride out of the cruciform slots or out of engagement with any other wrenching surfaces on the nut portion of the fastener.

I claim:

1. A driving and setting tool for blind fasteners of the type including a nut having wrenching surfaces formed thereon and threadably receiving a bolt having wrenching surfaces formed on the stem thereof, said tool comprising: a housing; a stationary tubular guide fixed to the housing and having wrenching surfaces formed thereon for engagement with the wrenching surfaces on the nut; and power operated means for applying driving torque to the bolt, said means including first and second co-axial coupling parts rotatable within said guide, said coupling parts each having at one end thereof respectively interengaging axial lugs spaced radially from the axis of said coupling parts for the transmission of driving torque from said first to said second part, said second coupling part being slidable axially relative to said first coupling part and having wrenching surfaces at the other end thereof for engagement with the wrenching surfaces on the bolt to apply driving torque thereto, and resilient means for biasing said second coupling part axially away from said first coupling part, the radial distance through which torque is applied to the bolt by said last-mentioned wrenching surfaces being less than the radial spacing of said lugs from the axis of said coupling parts whereby movement of said second coupling part toward said first coupling part by frictional engagement of said last-mentioned wrenching surfaces with the bolt will result in relative axial sliding movement of said lugs.

2. A driving and setting tool as defined by claim 1 in which said resilient means comprises a helical compression spring extending within co-axial bores formed in said first and second coupling parts.

3. A driving and setting tool as defined by claim 1 in which said resilient means includes a helical compression spring extending between external shoulders on said first and second coupling parts.

References Cited in the file of this patent

UNITED STATES PATENTS

| 1,343,667 | Evensen | June 15, 1920 |
| 2,525,117 | Campbell | Oct. 10, 1950 |
| 2,776,681 | Hopkins | Jan. 8, 1957 |
| 2,789,597 | La Torre | Apr. 23, 1957 |
| 2,820,382 | Smith | Jan. 21, 1958 |
| 2,882,773 | Wing | Apr. 21, 1959 |

FOREIGN PATENTS

| 518,070 | Great Britain | Feb. 16, 1940 |
| 809,942 | Great Britain | Mar. 4, 1959 |